United States Patent [19]

Kawaoka

[11] Patent Number: 5,784,149
[45] Date of Patent: Jul. 21, 1998

[54] FILM IMAGE PROCESSING METHOD AND APPARATUS

[75] Inventor: Yoshiki Kawaoka, Asaka, Japan

[73] Assignee: Fuji Photo Film Co., Ltd., Kanagawa, Japan

[21] Appl. No.: 718,261

[22] Filed: Sep. 20, 1996

[30] Foreign Application Priority Data

Sep. 21, 1995 [JP] Japan .................................. 7-242755

[51] Int. Cl.$^6$ .................................................. G03B 27/72
[52] U.S. Cl. .................................. 355/35; 355/69; 355/77
[58] Field of Search .................................. 355/40, 41, 77, 355/27, 35, 68, 69, 38; 358/403, 487, 342, 335, 455, 470; 396/570, 639

[56] References Cited

U.S. PATENT DOCUMENTS

| | | | |
|---|---|---|---|
| 5,101,286 | 3/1992 | Patton | 358/487 |
| 5,218,455 | 6/1993 | Kristy | 358/403 |
| 5,432,580 | 7/1995 | Tokuda | 396/570 |
| 5,440,401 | 8/1995 | Parulski et al. | 358/342 |
| 5,477,300 | 12/1995 | Fujmoto et al. | 396/568 |

FOREIGN PATENT DOCUMENTS

| | | |
|---|---|---|
| 422345 | 1/1992 | Japan . |
| 519359 | 1/1993 | Japan . |
| WO 9004301 | 4/1990 | WIPO . |

*Primary Examiner*—D. Rutledge

[57] ABSTRACT

Film images of all frames are captured in a first scanning in a low resolution for displaying as an index image, and the captured image data is stored in an image memory. Then, the index image is displayed on a display according to the image data. When the user designates a frame for printing and enters the print information of the frame by use of the index image displayed on the display, a second scanning of the frame is performed conforming to the print information. That is, the frame image is captured in a high resolution for printing, and the captured image data is stored in the image memory. Then, the frame image is printed on a printer according to the print information. While the printer is printing the frame image, the images of frames on the film are displayed frame by frame on the display in accordance with the image data for the index image stored in the image memory.

15 Claims, 4 Drawing Sheets

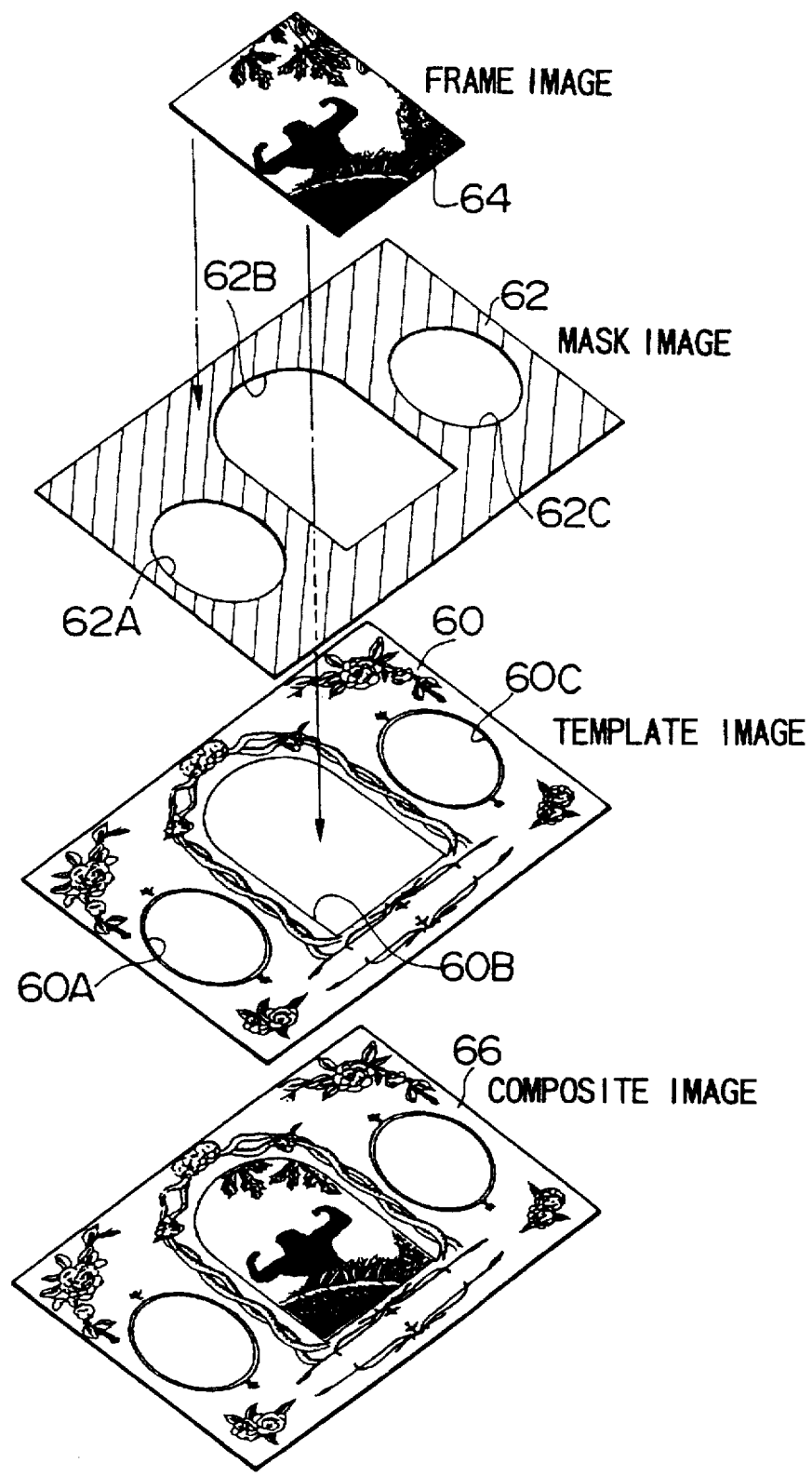

FILM IMAGE PROCESSING METHOD AND APPARATUS

BACKGROUND OF THE INVENTION

1. Field of the Invention

The invention relates to a film image processing method and apparatus. More particularly, the invention relates to a film image processing method and apparatus which makes it possible for a user to make good use of the time when a frame image is printed or the frame image is filed in a record medium.

2. Description of the Related Art

There is proposed a method of recording the information relating to an aspect ratio of a screen, a zoom magnification, a trimming, etc. in a magnetic record layer of photographic film in photographing or after photographing, and using the magnetic information recorded in the magnetic record layer in order to set the conditions in making a photographic print (Japanese Patent Application Laid-open Nos. 4-22345 and 5-19359).

WO90/04301 and others disclose a film player, which picks up the developed still photographic film with an image sensor such as a charge coupled device (CCD), and converts an image on the photographic film into an image signal, and displays the image on a monitor TV.

Likewise, there is proposed a printing apparatus, which picks up the developed still photographic film with an image sensor such as a CCD, and prints the picked-up film image. There is also proposed a printing apparatus to which digital technology is applied and which performs image processing such as zooming of the picked-up image for printing the image.

When the above-mentioned printing apparatus prints the film image, the amount of the image data is large, and hence it takes a large amount of time for the film image to be printed out. For example, it takes about two and half minutes for a TA thermal full color printer and a sublimation printer to print out the image data of A4 size and 300 dpi, and thereby the user must wait for two and half minutes.

Moreover, when the image data of high resolution is compressed and filed in a record medium, and if, for example, the data amounts of the image data in each frame is 24 megabytes (MB) and the data is compressed to 2 MB with a fixed format in a software when the data is filed, it takes approximately five minutes. Consequently, the user must wait for the digital image to be filed in the record medium for five minutes.

SUMMARY OF THE INVENTION

The invention has been developed under the above-described circumstances, and has, as its object, the provision of a film image processing method and apparatus which enables the user to make good use of the waiting time while waiting for the printing and filing.

In order to achieve the above-mentioned object, in the invention, a developed still photographic film is fed; the first scanning is executed in which plural frame images on the film are captured in a first resolution and first image data representing the plural frame images is stored; an index image composed of plural frame images is displayed on an image display means according to the first image data representing the plural frame images stored in the first scanning; at least one frame which is subject to a predetermined image processing such as a processing for printing an image and a filing processing including compression of the image data, is selected among the plural frames by means of the index image displayed on the image display means; the second scanning is executed in which an image of at least one selected frame is captured in a second resolution higher than the first resolution and second image data representing the captured frame image is stored; the predetermined image processing is executed according to the second image data; and while the predetermined image processing is being executed, the plural frame images on the film are displayed frame by frame on the image display means according to the first image data; or a image is displayed on the image display means according to third image data representing a previously-stored image such as advertisements appealing to the user.

Thus, during a predetermined image processing such as printing and filing according to the second image data, processing which requires a relatively long period of time, the plural frame images on the film are displayed frame by frame, and the image appealing to the user is displayed, so that the user can make good use of the waiting time.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar units throughout the figures and wherein:

FIG. 5 is a view illustrating the editing in which a frame image is decorated.

DETAILED DESCRIPTION OF THE PREFERRED EMBODIMENTS

Figure 1:
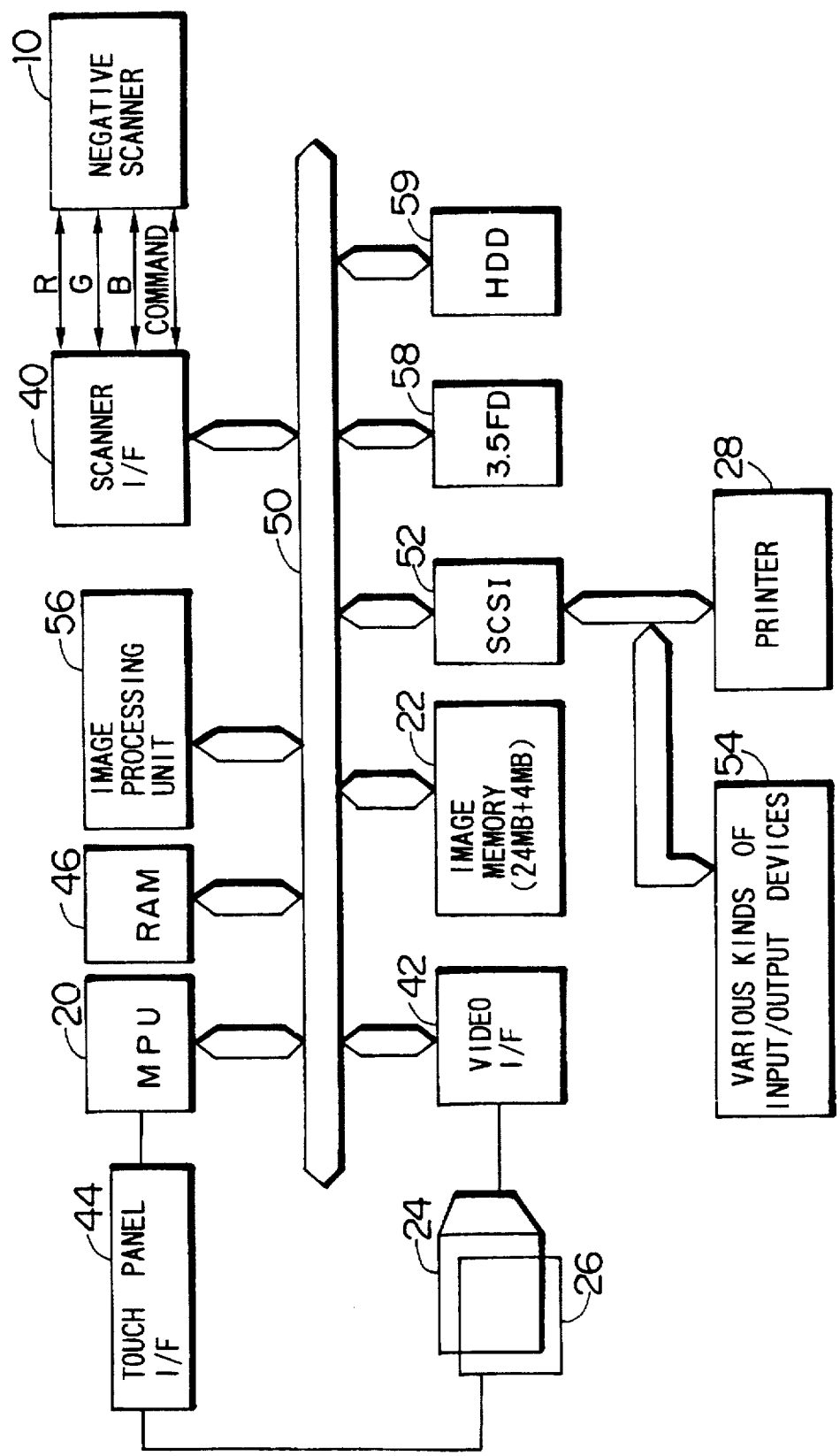
FIG. 1 is a block diagram illustrating an embodiment of a film image processing apparatus according to the invention.

FIG. 1 is a block diagram illustrating an embodiment of a film image processing apparatus according to the invention. The film image processing apparatus mainly comprises a negative scanner 10, a micro processing unit (MPU) 20, an image memory 22, a display 24, a touch panel 26, and a printer 28.

First, an explanation will be given about the details of the negative scanner 10.

Figure 2:
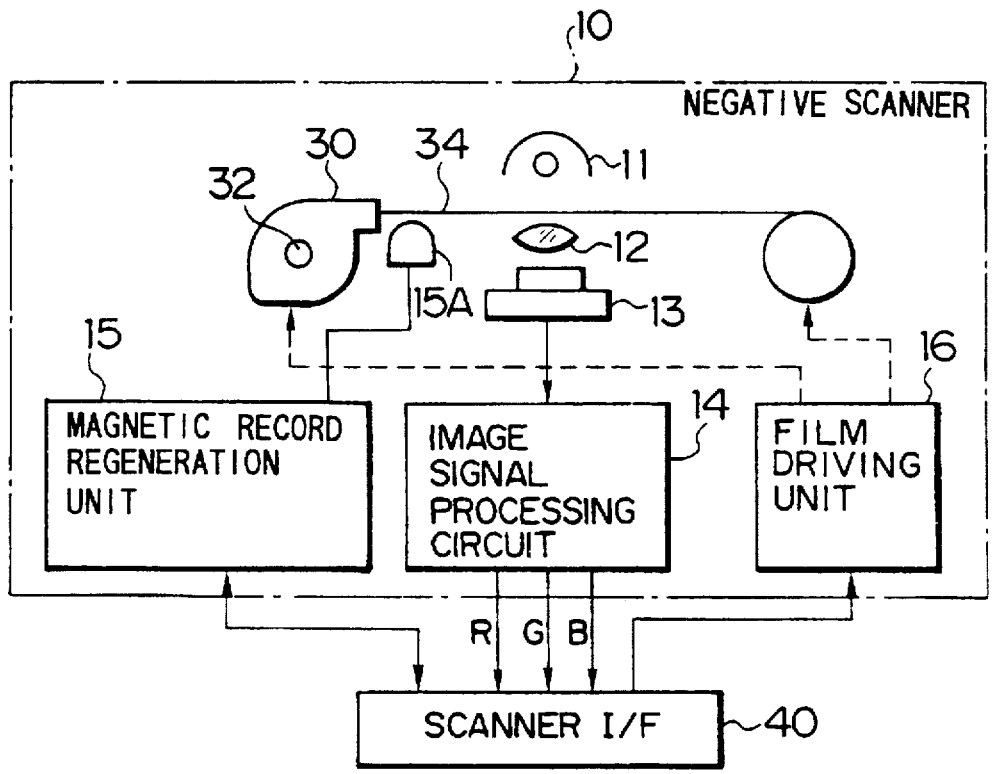
FIG. 2 is a block diagram illustrating the details of a negative scanner in FIG. 1.

As shown in FIG. 2, the negative scanner 10 mainly comprises an illumination light source 11, a taking lens 12, a CCD line sensor 13, an image signal processing circuit 14, a magnetic record regeneration unit 15, a film driving unit 16, and a cartridge containing unit (not shown) which contains therein a film cartridge 30.

Figure 3:
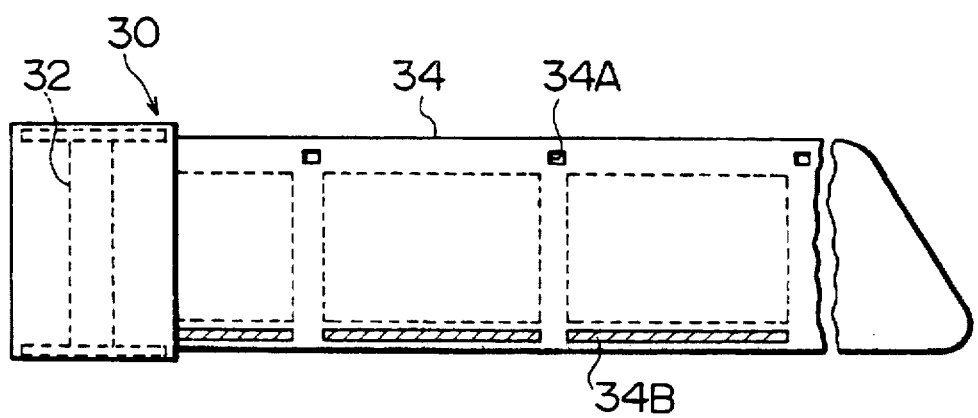
FIG. 3 is a view illustrating an example of a film cartridge in FIG. 2.

As shown in FIG. 3, the film cartridge 30 has a single spool 32, and developed photographic film 34 is wound around the spool 32. A perforation 34A indicating a position of each frame is punched on the film 34. A magnetic record layer 34B is formed on the whole surface of the film 34 or at the edge of the film 34. The print information relating to the number of prints, zooming, trimming, etc. can be recorded in the magnetic record layer 34B corresponding to each frame via a magnetic head 15A of the magnetic record regeneration unit 15, and the print information can be regenerated reversely.

An image light of the film 34 illuminated by the light source 11 is formed on a light-accepting surface of the CCD line sensor 13 through the taking lens 12. The image light is charge-accumulated for a predetermined period of time in each sensor having R, G or B filter. Then, the image light is converted into signal charge corresponding to the intensity of the light. The signal charge accumulated as described above is read into a shift register with a lead gate pulse of a predetermined period generated by a CCD drive circuit (not shown). Then, the signal charge is sequentially read as an image signal by a register transfer pulse generated by the CCD drive circuit.

A signal processing is performed for the image signal, which is sequentially read out from the CCD line sensor 13, by the image signal processing circuit 14, and the image signal is stored in the image memory 22 (FIG. 1) via a scanner interface 40 and a bus line 50.

The film driving unit 16 has a film feed unit engaging the spool 32 of the film cartridge 30 for driving the spool 32 forward and backward, and a film windup unit for winding up the film 34 fed by the film feed unit. The film driving unit 16 is able to feed the film 34 sequentially or changes a feeding speed frame by frame in accordance with a variety of film driving instructions given via the scanner interface 40. When the film cartridge 30 is loaded, the film feed unit drives the spool 32 of the film cartridge 30 clockwise, and feeds the leading end of the film 34 from the film cartridge 30.

Incidentally, the CCD line sensor 13 has sensors of, for example, 2048 (2k) pixels in the direction perpendicular to the film feeding direction (the main-scanning direction). The number of pixels in one frame captured in the same direction as the film feeding direction (the sub-scanning direction) changes according to the film feeding speed if the period of the lead gate pulse, etc. of the CCD driving circuit is not changed. The maximum number of pixels in the sub-scanning direction is 4,000 (4k). That is, the maximum number of pixels (resolution) in one frame is 2k×4k.

The image memory 22 has a storage area of 24 MB storing the image data of one frame in a high resolution, and a storage area of 4 MB storing the image data of all frames in a low resolution.

The image signal is sent to the display 24 via a video interface 42. The display 24 displays, for example, an index image created according to the image data of all frames stored in the image memory 22 in the low resolution. The touch panel 26 is arranged on a screen of the display 24, and the user touches it when the print information of each frame is entered.

The print information entered from the touch panel 26 is stored in random access memory (RAM) 46 via a touch panel interface 44 and the bus line 50.

The bus line 50 connects to a printer 28 via a small computer system interface (SCSI) 52, and it may connect to various kinds of input/output devices 54 such as plural negative scanners, a device regenerating a record medium in which the image data of the photographic film is recorded, and plural printers (corresponding to all sizes).

Moreover, the bus line 50 connects to an image processing unit 56 for image processing such as expansion/compression of an image, trimming, contour enhancement, or the like. The bus line 50 also connects to an external interface 58 for entering character data and decoration patterns, and an internal storage device 59 for storing the character data and the decoration patterns.

The image processing unit 56 performs a digital processing of the image data stored in the image memory and converts it into the desired image data according to the image processing information relating to the expansion/compression of the image, the trimming, the contour enhancement, etc.

The MPU 20 controls each unit via the bus line 50, and performs the following processes.

First, when the film cartridge 30 is set in the negative scanner unit 10, the MPU 20 has the film driving unit 16 (FIG. 2) execute the film loading. When the film loading is completed, the MPU 20 executes a pre-scanning of the film 34. That is, the MPU 20 feeds the film 34 at a high speed, and decreases the image data, and stores the image data in the low resolution of all frames (e.g. 40 frames) in the film 34 in the 4 MB storage area of the image memory 22.

Figure 4:
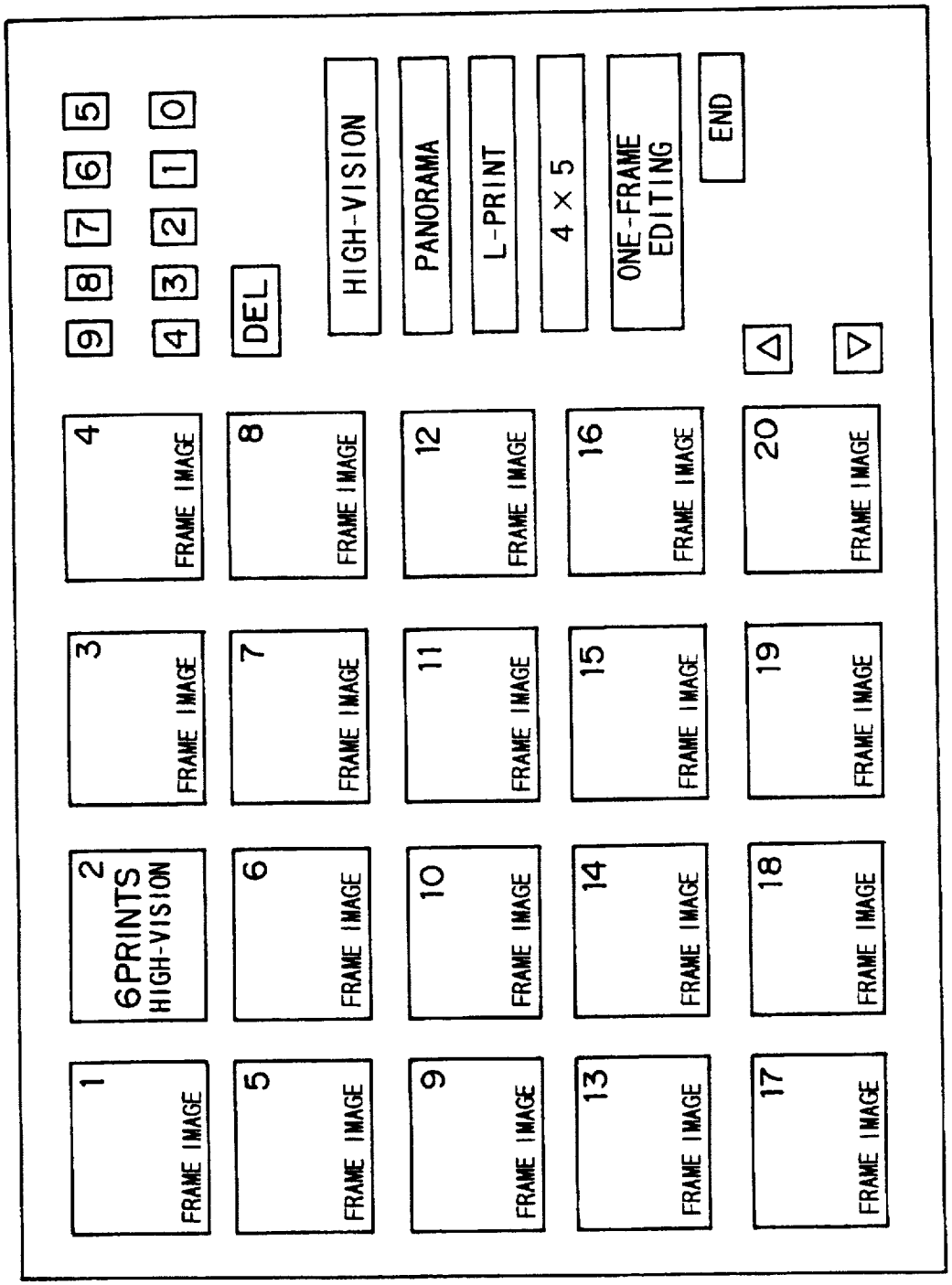
FIG. 4 is a view illustrating an example of a display screen of a display in FIG. 1 on which an index image is displayed.

Then, the MPU 20 displays the index image composed of plural frames (e.g. 20 frames) on the display 24 as shown in FIG. 4 according to the image data of all frames. Incidentally, when the index image is displayed, numbers 1, 2, ... are designated on each frame in an order in which the image data of each frame is captured in the pre-scanning, and a character signal representing a number of each frame is generated. As a result, the frame images, on which the frame numbers are superimposed, and the numbers (0–9) used for designating the number of prints, the characters "DEL" for directing the deletion, the characters for designating the print type "HIGH-VISION", "PANORAMA", "L-PRINT", and "4×5", the characters for directing the one-frame editing such as zooming and trimming, the characters for directing the completion, the marks for directing the up and down scroll, and so forth are also displayed as shown in FIG. 4.

When the index image is displayed on the display 24 as described above, the user uses the touch panel 26 while watching the index image in order to enter the print information required for printing the frame image.

First, the user touches a frame image to be printed. Incidentally, the image processing is performed for the touched frame image; for example, the frame image is framed or its frame number blinks so that it can be distinguished from the other frame images.

Next, the user touches the number on the screen for designating the number of prints so as to designate the number of prints from the frame image. Similarly, the user touches the characters on the screen for designating the print type so as to designate the print type of the frame image. Incidentally, in FIG. 4, the frame of the frame No. 2 is designated for printing. The number of prints is designated to be 6, and the print type is designated to be high-vision. As shown in FIG. 4, the contents of the print are superimposed on the frame image just like the frame number.

As described above, the print information of all frames (or frames designated for printing) in the film 34 is entered all together.

The print information includes the information for adding character data to the frame image and putting the frame image in a predetermined decoration pattern, the information for composing the frame images to make an album, and the like.

For example, if a template image 60 shown in FIG. 5 is selected as the decoration pattern, three frames which are put into three windows 60A, 60B and 60C of the template image, are selected from the index image. Then, each selected frames is enlarged, contracted, or the like, to be a desired size, and the frames are put into three windows 60A, 60B and 60C of the template image 60. That is, a mask image 62 is prepared for the template image 60, and the mask image 62 is provided with three windows 62A, 62B and 62C corresponding to three windows 60A, 60B and 60C of the template image 60. For example, when the frame image 64 is put into the window 60B of the template image 60, the frame image 64 is trimmed by the window 62B of the mask image 62, and the required image is captured. The trimmed image and the template image 60 are composed. Likewise, trimmed images are put into the windows 60B and 60C of the template image 60. The information relating to the editing, the image composition, etc. is entered interactively on the screen of the display 24.

When the entry of the print information is completed, the frame image is printed as described below.

First, a fine scanning of the frame designated for printing is executed. That is, the frame designated for printing is fed by one frame at a low speed, the image data (2048×3598) of the frame in the high resolution is captured, and the captured image data is stored in the 24 MB storage area of the image memory 22. Incidentally, the image is captured according to the print information during the fine scanning. For example, if it is determined that it is preferable to start processing at a ½ line of the maximum number of lines in view of the pixel size for the printout in the print information relating to zooming, etc., the film feeding speed is doubled so that the scanning time can be shortened.

Then, the image data of one frame in the high resolution, which is stored in the image memory 22, is sent to the image processing unit 56, and then the desired image-processing is performed for the image data according to the print information stored in the RAM 46.

As described above, the image processing is performed for the image data of one frame in the high resolution, which is stored in the image memory 22, according to the print information, and then the image data is transferred to the printer 28. The printer 28 accurately prints the frame image, for which the desired image editing has been performed.

When the printer 28 finishes printing the frame, the fine scanning of the next frame is executed. The image data of the frame which has already been printed is deleted.

After that, the printer 28 prints the next frame image, for which a desired image editing has been performed, in the above-mentioned manner.

As stated above, the fine scanning of each frame designated for printing and the printing on the printer 28 are repeated alternately, and the frame images, for which the image editing is performed according to the print information entered all together previously, are printed sequentially.

On the other hand, while the printer 28 is printing as described above, the MPU 20 executes a slide show on the display 24 by means of the image data captured into the image memory for displaying the index image, so that the images of all frames on the film are displayed frame by frame. That is, the image data for the index image display is processed so that the size of each frame in the index image can be appropriate. Then, the processed frame images are sequentially displayed on the display 24.

As a result, the user can wait for the printing to be completed while enjoying the slide show. Incidentally, the frame images are displayed in various orders and ways; the frame images are displayed forward, backward, and randomly, and the plural frame images overlap each other, so that the user can enjoy the slide show.

When the printing of all frames designated for printing is completed, the film 34 is rewound into the film cartridge 30. In this case, the print information stored in the RAM 46 is recorded in the magnetic record layer 34B on the film 34 with the magnetic record regeneration unit 15 of the negative scanner unit 10. The print information recorded in the magnetic record layer 34B can be regenerated for use in the next printing. That is, in order to get a printout which is completely the same as the previous one, the print information recorded in the magnetic record layer 34B can be used so as to save the trouble of entering the print information, or the like.

In this embodiment, during printing, the slide show is performed in which the plural frame images are displayed frame by frame on the display 24 according to the image data for the index image display. The slide show may be performed during the fine-scanning of the frame designated for printing.

The film processing apparatus of the invention is able to print the frame image on the film, and file the image data in the record medium such as a floppy disk, an optical disk, and a memory card. When the image data is filed in the record medium, for example, the image data of 24 MB is compressed to be 2 MB with a fixed format in the software, and the compressed image data is filed in the record medium. The slide show may be performed during the waiting time for filing.

Moreover, if the index printing is ordered, thie film image processing apparatus is able to perform the index printing according to the image data representing the index image, data which is stored in the pre-scanning, or the image data representing the index image, data which is obtained in re-scanning for the index printing (the image data obtained in the re-scanning has a higher resolution than the image data obtained in the pre-scanning; however, it has a lower resolution than the image data obtained in the fine scanning.) Of course, the slide show may be performed during the waiting time for the index printing.

Further, in this embodiment, the slide show is performed during the waiting time for printing, etc.; however, the invention is not restricted to this. The image, which is previously stored in the apparatus (the image other than film such as the image appealing to the user; e.g. shop advertisements), and the index image may be displayed on the display 24.

Furthermore, on the screen of the display 24 displaying the index image, it is favorable that a frame, of which print information is entered, is framed, or the like in such a manner that the frame can be distinguished from other frames. Further, a frame being subject to printing or filing is favorably displayed in such a manner that the frame can be distinguished from other frames.

In addition, during the waiting time for printing, the composite image and the edited image may be displayed on the display 24 according to the print information shown in FIG. 5.

As set forth hereinabove, according to the invention, during the waiting time for the printing and filing, the slide show is performed in which the frames of the index image are displayed frame by frame, and the index image, the edited image, the prepared image, or the like are displayed. Thereby, the user can make good use of the waiting time.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A film image processing method comprising the steps of:
   scanning a developed still photographic film to capture a plurality of frame images at a first resolution, and storing first image data representing said plurality of frame images;
   displaying an index image composed of at least two frame images according to said first image data;
   entering print information to print one of said plurality of frames or to print said index image;
   scanning said film to capture a frame image according to said print information at a second resolution higher than said first resolution, and storing second image data representing said captured frame image;
   printing said frame image or said index image according to said second image data; and
   displaying, during said printing step, an image according to at least one frame image of said first image data and third image data, representing a previously-stored image.

2. A film image processing method comprising the steps of:
   scanning a developed still photographic film, including a magnetic record layer in which magnetic information can be recorded, to capture a plurality of frame images at a first resolution, and storing first image data representing said plurality of frame images;
   subsequent to reading print information, for printing at least one frame image, from said magnetic record layer on said film, scanning said film to capture a frame image at a second resolution higher than said first resolution, and storing second image data representing the captured frame image;
   printing an image corresponding to said second image data; and
   displaying, during said printing step, said plurality of frame images on a frame by frame basis, according to said first image data.

3. A film image processing method comprising the steps of:
   scanning a developed still photographic film to capture a plurality of frame images at a first resolution, and storing first image data representing said plurality of frame images;
   displaying an index image composed of at least two frame images according to said first image data;
   selecting at least one frame of said index image, subject to predetermined image processing among said plurality of frames;
   scanning at least the one selected frame of said film to capture the at least one selected frame at a second resolution higher than said first resolution, and storing second image data representing captured frame image;
   executing said predetermined image processing according to said second image data; and
   displaying during execution of said predetermined image processing, an image according to at least one of said first image data and third image data, representing a previously-stored image.

4. The film image processing method according to claim 3, further comprising the step of, while performing said second resolution scanning, displaying an image according to at least one of said first image data and said third image data.

5. The film image processing method according to claim 3, wherein said predetermined image processing includes at least one of a processing for printing an image corresponding to said second image data, and processing for compressing said second image data and storing compressed data in an external record medium.

6. The film image processing method according to claim 5, further comprising the steps of:
   generating an index image including a plurality of frame images according to said second image data; and
   printing said index image.

7. The film image processing method according to claim 3, further comprising the step of, while executing said predetermined image processing, displaying said plurality of frame images on a frame by frame basis according to said first image data.

8. The film image processing method according to claim 3, further comprising the step of, while executing said predetermined image processing, displaying said index image according to said first image data.

9. The film image processing method according to claim 8, wherein a frame selected for said predetermined image processing is displayed in such a manner that said frame is distinguished from other displayed frames.

10. The film image processing method according to claim 8, wherein a frame being subject to said predetermined image processing is displayed in such a manner that said frame is distinguished from other displayed frames.

11. The film image processing method according to claim 3, further comprising the step of, while executing said predetermined image processing, displaying an image obtained by at least one of composing and editing said frame image according to said first image data.

12. The film image processing method according to claim 3, further comprising the step of, while executing said predetermined image processing, displaying an image appealing to a user according to said third image data.

13. A film image processing apparatus comprising:
   image capturing means, including film feeding means for feeding a developed still photographic film and a line sensor for capturing a film image while said film feeding means is feeding said film, for capturing a plurality of frame images at a first resolution during a first scanning, and for capturing a frame image at a second resolution, higher than said first resolution, during a second scanning, said frame image being previously designated;
   an image memory for storing therein first image data representing said plurality of frame images at said first resolution and second image data representing said frame image at said second resolution;
   image display;
   first image processing means for generating an image signal representing an index image composed of a plurality of frames of said first image data stored in said image memory, and for outputting said image signal to said image display;

entry means for entering print information or filing information for at least one frame of said plurality of frames displayed on said image display, thereby designating the frame image for second scanning;

means for generating image data for printing or filing according to said second image data stored in said image memory, and for outputting the generated image data to a printer or a filing unit; and second image processing means for generating an image signal for displaying said plurality of frame images on a frame by frame basis according to said first image data stored in said image memory, and for outputting said image signal to said image display while image data is being output to said printer or said filing unit.

14. A film image processing apparatus comprising:

image capturing means, including film feeding means for feeding a developed still photographic film provided with a magnetic record layer in which magnetic information is recorded and a line sensor for capturing a film image while said film feeding means is feeding said film, for capturing a plurality of frame images at a first resolution during a first scanning, and for capturing a frame image of a second resolution, higher than said first resolution, during a second scanning, said frame image being previously designated for printing;

an image memory for storing therein first image data representing said plurality of frame images at said first resolution and second image data representing said frame image at said second resolution;

image display;

first image processing means for generating an image signal representing an index image composed of a plurality of frames of said first image data stored in said image memory, and for outputting said image signal to said image display;

magnetic information reading means for reading magnetic information, including print information of a frame subject to printing, from said magnetic record layer on said film;

means for generating image data for printing according to said second image data stored in said image memory, and for outputting the generated image data to a printer; and second image processing means for generating an image signal for displaying said plurality of frame images on a frame by frame basis according to said first image data stored in said image memory, and for outputting the generated image signal to said image display while image data is being output to said printer.

15. A film image processing method comprising the steps of:

scanning a developed still photographic film to capture a plurality of frame images at a first resolution, and storing first image data representing said plurality of frame images;

displaying an index image composed of at least two frame images according to said first image data;

entering print information to print at least two frame images of said plurality of frames;

a) scanning said film to capture a frame image according to said print information at a second resolution higher than said first resolution;

b) storing second image data representing said captured frame image;

c) printing said frame image according to said second image data;

repeating the steps (a)–(c) on a frame by frame basis until all frames, of which said print information has been entered, are printed; and displaying, during said printing step, an image according to at least one frame image of said first image data and third image data, representing a previously stored image.

* * * * *